(12) United States Patent
Von Neindorff et al.

(10) Patent No.: US 10,681,248 B2
(45) Date of Patent: Jun. 9, 2020

(54) METHOD FOR CONTROLLING INK IN AN INKJET PRINTING MACHINE BY SIMULATING THE FILM THICKNESS OF CMY INKS

(71) Applicant: HEIDELBERGER DRUCKMASCHINEN AG, Heidelberg (DE)

(72) Inventors: Boris Von Neindorff, Osdorf-Gut Borghorst (DE); Peter Weinholz, Tuettendorf (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 16/384,303

(22) Filed: Apr. 15, 2019

(65) Prior Publication Data

US 2019/0342468 A1 Nov. 7, 2019

(30) Foreign Application Priority Data

May 2, 2018 (DE) .......................... 10 2018 206 753

(51) Int. Cl.
*H04N 1/00* (2006.01)
*H04N 1/60* (2006.01)
(52) U.S. Cl.
CPC ........... *H04N 1/603* (2013.01); *H04N 1/6008* (2013.01); *G06T 2207/10024* (2013.01)
(58) Field of Classification Search
CPC combination set(s) only.
See application file for complete search history.

(56) References Cited

U.S. PATENT DOCUMENTS

| 2003/0234943 | A1 | 12/2003 | Van Bael |
| 2006/0170938 | A1 | 8/2006 | Ibarluzea et al. |
| 2009/0268251 | A1 | 10/2009 | Nishide |
| 2018/0278805 | A1 | 9/2018 | Krabbenhoeft et al. |
| 2019/0297228 | A1* | 9/2019 | Takahira .............. H04N 1/6022 |

FOREIGN PATENT DOCUMENTS

| DE | 102016205779 A1 | 6/2016 |
| DE | 102018201669 A1 | 9/2018 |
| EP | 1441505 A2 | 7/2004 |

* cited by examiner

*Primary Examiner* — Barbara D Reinier
(74) *Attorney, Agent, or Firm* — Laurence A. Greenberg; Werner H. Stemer; Ralph E. Locher (57) ABSTRACT

A method for inkjet printing machine color control includes color transformation of print data from first color space to process color space in a first stage using a computer transforming print data from the first to an intermediate color space while keeping special colors, and a second stage transforming corrected print data including special colors from intermediate to process color space. The computer uses print data corrected after the first stage as second stage starting values. Print data transformed into the process color space are printed. First color space corresponds to CMYK, flexographic printing or RGB color space with special colors, intermediate color space corresponds to CMYK color space with special colors, process color space corresponds to CMYK color space with additional process colors. The computer corrects CMY, not K print data or special not transformed colors, when correcting print data in the intermediate color space after the first stage.

5 Claims, 7 Drawing Sheets

Fig. 7

METHOD FOR CONTROLLING INK IN AN INKJET PRINTING MACHINE BY SIMULATING THE FILM THICKNESS OF CMY INKS

CROSS-REFERENCE TO RELATED APPLICATION

This application claims the priority, under 35 U.S.C. § 119, of German Patent Application DE 10 2018 206 753.8, filed May 2, 2018; the prior application is herewith incorporated by reference in its entirety.

BACKGROUND OF THE INVENTION

Field of the Invention

The invention relates to a method for controlling ink in an inkjet printing machine by imitating the CMY ink film thicknesses of lithographic offset printing inks.

The technical field of the invention is the field of digital printing.

Both in lithographic offset printing and in flexographic printing, adapting the film thickness of process colors for color correction in a color control process of a printing operation is a common way of correcting substrate-related color changes or to meet a customer's specific demands such as overinking, for instance. In digital printing operations, especially inkjet printing, those purely mechanical methods do not exist. Ink jet printing relies on the assumption that machine-specific and substrate-specific color profiles will ensure accurate color reproduction.

An offset printing press usually produces a job in accordance with a standard. However, it is not uncommon for a job to have been manipulated at the press in the presence of the customer. A problem that occurs in the case of such specific customer requests or repeat jobs is that an accurate color reproduction is of secondary importance to the operator. In that case, a way for the operator to correct the individual process colors is to modify the film thickness of the respective process color. An operator knows about those corrective options and how the modified film thickness influences the total appearance of the print from years of experience. Now an operator will expect a similar option for inkjet printing machinery.

Methods that have been known so far provide an operator with a way of correcting the process colors of the inkjet printing machine in the form of so-called look-up tables that have previously been calculated using a factor or a correction curve.

A disadvantage of that process is that the process colors of an inkjet printing machine are different from the process colors of an analog printing press. In addition, many digital printing machines, especially inkjet printing machines, print more than four process colors. That means that an operator of a traditional printing press no longer understands the composition of the colors nor consequently the effects of corrections to individual process colors. Moreover, in most cases, all special colors are converted to process colors for digital printing machinery. Therefore, any modification of the process colors would likewise influence the color composition of the special colors. In offset printing and flexographic printing, that is not the case. Another difficulty is that in inkjet printing machines, ink film thickness, as represented by the amount of ink to be applied, may not be increased indefinitely. An ink limit needs to be respected at all times, a fact that means that color correction options are limited from the start.

In that context, German Patent Application DE 10 2016 205 779 A1 discloses a method for determining the ink limit in inkjet printing machines. The document discloses printing a test chart on an inkjet printing machine, subsequently determining the actual L*a*b color values in color measurement patches of such a print by using a color measurement device and determining color deviations in the color measurement patches of the test chart from target color values of the color measurement patches.

German Patent Application DE 10 2017 204 684 A1, which relates to the color control process in inkjet printing machines, discloses a method for maintaining the black composition of at least one object positioned to overprint a special color in a print image for use in preprint color management of a printing operation by using a computer, the special color and the at least one object being transformed into a combination of process colors of the printing operation in the course of the color management process and that combination of process colors then being used to generate the print image in a printing machine. The method is distinguished in that the color transformation into the process colors of the printing operation is achieved in two stages, in a first stage the color transformation into the process colors is carried out while keeping the special colors, subsequently an analysis is made to find out whether the at least one object is printed onto the special color, and the black proportion of the at least one object is removed, and in a second stage the special color is transformed into the process colors and subsequently the black proportion of the at least one object is maximized.

However, that prior art document does not provide any solution to the problem of correcting color control in a digital/inkjet printing machine based on a printer's knowledge and experience from offset and flexographic printing.

SUMMARY OF THE INVENTION

It is accordingly an object of the invention to provide a method for controlling ink in an inkjet printing machine by simulating the film thickness of CMY inks, which overcomes the hereinafore-mentioned disadvantages of the heretofore-known methods of this general type and which allows an operator to apply his or her color control skills acquired in offset printing to digital/inkjet printing color control processes.

With the foregoing and other objects in view there is provided, in accordance with the invention, a method for controlling color in a printing process on an inkjet printing machine by using a computer, wherein the color transformation of print data from a first color space to a process color space as required by the printing process occurs in two stages and subsequently the print data transformed into the process color space are printed on the inkjet printing machine. According to the method, after the first color transformation stage, the print data are corrected and the corrected print data are then used as starting values for the second color transformation stage. The approach of the method of the invention is to give an operator whose experience was mainly acquired in the field of offset printing a chance to fall back on his or her offset printing knowledge. In accordance with the invention, this is done by providing operators with the process colors they are familiar with from offset or flexographic printing. This means that changes to the film thickness of the relevant color may be made. These changes will influence the printed image that is later to be produced by the inkjet printing machine. Since clearly there are no traditional film thicknesses in inkjet printing, the approach of giving an operator access to the actual inkjet printing process colors—an approach that would be conceivable in principle—does not work. The process color space of an inkjet printing machine does not correspond to the process color space of an offset printing press or of a flexographic printing press that the operator is familiar with. A press operator is used to modifying the film thickness of a specific color in an offset printing operation by a specific factor to obtain a specific change in the resultant printed image. However, if the same change was made to the corresponding color in the inkjet color space, the changes in the resultant printed image would be completely different and completely mystifying to the operator. A key to a solution to this problem lies in the process of transforming colors for an inkjet printing operation. This is preferably done in two stages. In a first stage, a transformation is made from a first color space that is used by the preprint department to create the print image data, for instance RGB or a special CMYK color space, into a defined CMYK color space and in a second stage, a transformation is made from this specific CMYK color space to the process color space of the inkjet printing machine. The point is that the transformation of the print image data into the specific CMYK color space while keeping potential special colors is made to obtain a specific starting value based on which the transformation into the actual process color space without potential special colors may be made. This provides a way of allowing operators to use measures that they are familiar with to manipulate the individual print colors. This specific CMYK color space to which the transformation is made in the first stage (if the input print data are not already in this color space anyway) relatively accurately corresponds to the color space in which the operator may adjust the film thickness of the individual colors in an offset or flexographic printing operation. Thus a core aspect of the method of the invention is to make the intermediate results of the two-stage color transformation available to the operator, allowing desired color control adjustments virtually corresponding to a film thickness adjustment to be made at this point in order to carry out the second stage of the color transformation into the process color space of the inkjet printing machine using the correspondingly modified values. This allows operators to apply their color control skills that have been acquired in the field of offset or flexographic printing to inkjet printing operations, even though they do not have the actual skills in this field to directly manipulate the actual process color values in the process color space of the inkjet printing machine.

Another preferred development of the method of the invention in this context is that in a first stage, the computer transforms print data of the printing operation from the first color space into an intermediate color space while keeping all special colors that are used, whereas in a second stage, the computer transforms the corrected print data with the special colors from the intermediate color space into the process color space. The decisive aspect is that a transformation is made from the first color space, e.g. RGB-specific CMYK, etc., into an intermediate color space while keeping all special colors that are used. This allows operators to manipulate the corresponding colors in the intermediate color space in accordance with a simulated film thickness modification. Then, in the second color transformation stage, the transformation is made into the process color space of the inkjet printing machine. In this process, the special colors that have been kept so far are represented by the process colors of the inkjet printing machine. As explained above, this allows operators to make potential modifications in an offset-like intermediate color space they are familiar with rather than in the unfamiliar inkjet process color space.

A further preferred development of the method of the invention in this context is that the first color space corresponds to a CMYK color space or to a flexographic printing color space or to an RGB color space, each with special colors, and the intermediate color space corresponds to a CMYK color space with special colors, whereas the process color space corresponds to a CMYK color space with the additional process colors OGV. The first color space may correspond to a variety of color spaces, depending on which color spaces the preprint department uses to create the print image data. In this context, a simplified special case is when the intermediate CMYK color space plus special colors is already used in the preprint department. In this special case, the first color transformation stage is of course eliminated. However, this does not change anything about the aspect of the invention of modifying the colors of the intermediate color space by the operator prior to the transformation into the process color space. In terms of the method of the invention, the question which color space is used as the first color space, i.e. whether it is a RGB, flexographic, CMYK or other color space, is completely irrelevant. An aspect that is always the same is the transformation into the intermediate CMYK color space with special colors, whereas the process color space always corresponds to the process color space of the inkjet printing machine, in general a CMYK color space with the additional process colors OGV, i.e. orange, green, violet. The use of these seven default process colors allows the entire RGB color space plus special colors to be covered.

An added preferred development of the method of the invention in this context is that when the print data of the process color space are corrected by the computer in the intermediate color space after the first stage of the color transformation, only the CMY print data are corrected but not the K print data or the non-transformed special colors. It has been found that only the CMY print data ought to be corrected in the intermediate color space by the operator when the print data are corrected by the operator by using the computer. An option to manipulate the black (i.e. key) print data and the special color print data that are still available at this point is not made available to the operator because such a manipulation would have extremely negative effects on the resultant print image. Also, this would not correspond to the method which is known from offset or flexographic printing and which the method of the invention is to emulate or simulate, since in accordance with this known method, an operator also just manipulates the corresponding film thicknesses of C, M and Y and not those of K or of the special colors.

An additional preferred development of the method of the invention in this context is that the print data in the first color space are subdivided into areas with different color spaces. A case is possible in which the print data provided from the preprint department are in more than just the one specific color space as the first color space but instead in two or even more color spaces. This may occur, for instance, if texts and various graphics and images are used. This means that the text is in a specific color space and the images are in one or even more different color spaces. In this case, all first color spaces need to be transformed into the intermediate color space to provide a uniform intermediate color space, preferably with CMYK plus special color.

Another preferred development of the method of the invention in this context is that the correction of the print data of the process color space by the computer is implemented by using a correction factor or a correction curve for every individual CMY component of the print data. The modification of the respective color values in the intermediate color space is carried out by applying a correction factor or a correction curve for every individual CMY component. This is applied to the respective corresponding CMY value and is directly dependent on the corresponding input of the respective operator.

An added preferred development of the method of the invention in this context is that the correction of the print data of the process color space in the intermediate color space by the computer by using the correction factor/correction curve after the first stage of the color transformation is limited by a maximum ink limit. Color control in inkjet printing is subject to a so-called maximum ink limit. This is due to the fact that a specific location may not receive any desired amount of ink because too much ink would have a negative effect on the printing substrate and/or on the drying behavior of the ink. This ink limit ought to be respected when the print data are corrected. This limit poses a slight restriction to an application of the method of the invention as compared to the film thicknesses in offset and flexographic printing, but it is necessary due to the specific requirements of inkjet printing. Such a maximum ink amount limit is very easy to implement, for instance by a corresponding block on the interface provided to the operator by the computer.

A concomitant preferred development of the method of the invention in this context is that to correct the print data of the process color space, the computer provides a user interface allowing an operator of the inkjet printing machine to input correction values. In order for the operator to be able to modify the corresponding color values in the intermediate color space, the computer needs to provide a suitable interface for modifying these color values prior to the transformation into the actual process color space. This may be implemented by using a graphical user interface (GUI), for instance. However, in principle, every type of interface suitable for making the required data inputs for modifying colors may be used in the method of the invention.

Other features which are considered as characteristic for the invention are set forth in the appended claims.

Although the invention is illustrated and described herein as embodied in a method for controlling ink in an inkjet printing machine by simulating the film thickness of CMY inks, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings. The invention as such as well as further developments of the invention that are advantageous in structural and functional terms will be described in more detail below with reference to the associated drawings and based on at least one preferred exemplary embodiment.

DETAILED DESCRIPTION OF THE INVENTION

Figure 1:
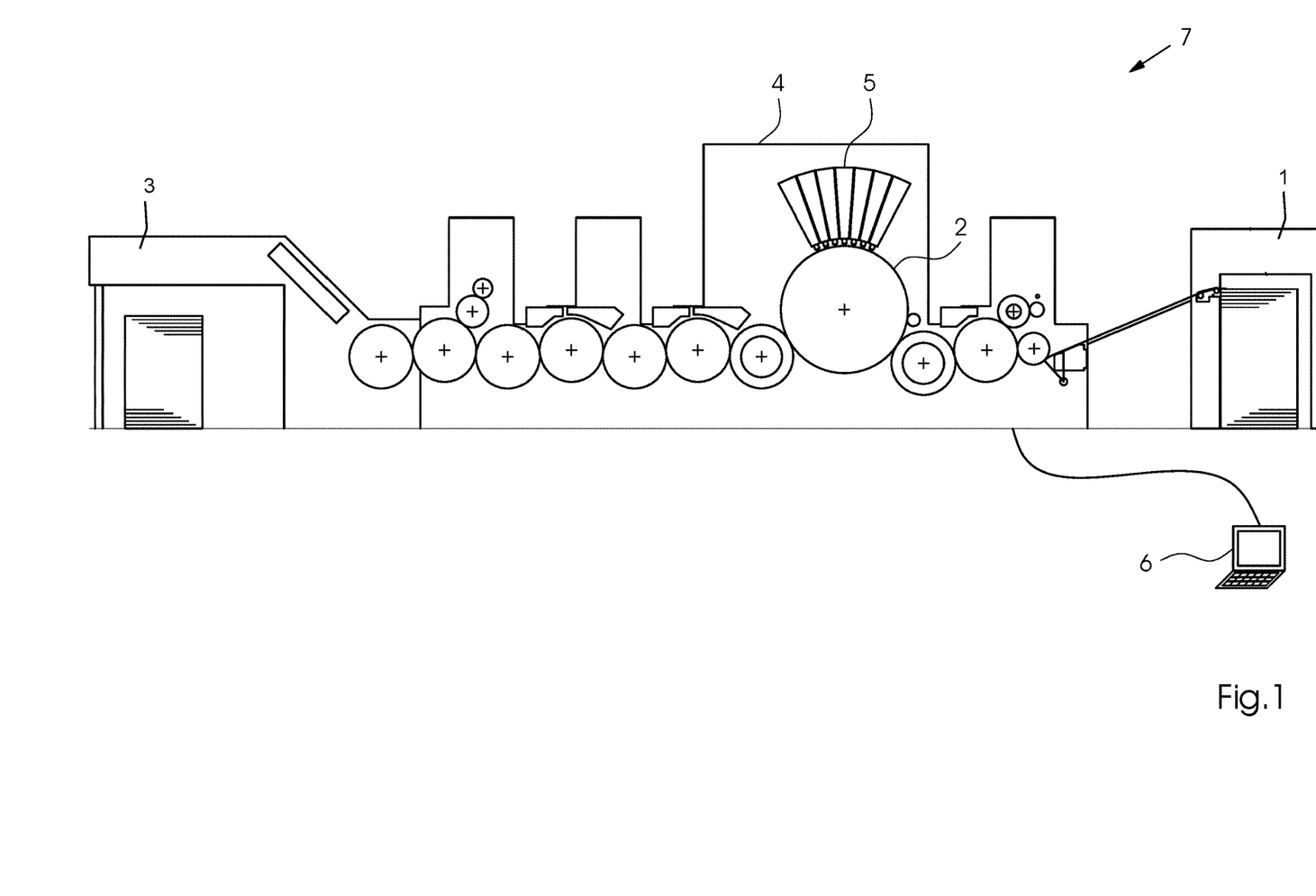
FIG. 1 is a diagrammatic, longitudinal-sectional view of an example of an inkjet printing machine.

Referring now in detail to the figures of the drawings, in which mutually corresponding elements have the same reference symbols, and first, particularly, to FIG. 1 thereof, it is seen that the field of application of the preferred exemplary embodiment is an inkjet printing machine 7. An example of the structure of such a printing machine 7 is shown in FIG. 1. The printing operation is monitored by a control unit 6. A sheet or printing substrate 2 is conveyed in a conveying direction from a feeder 1 over a transfer cylinder to a printing unit 4 and to print heads 5, which are formed of one or more rows of printing nozzles. The cylinders are driven by one or more drives. Then the printing nozzles in the print heads 5 apply the ink to the sheet 2 to create the print. The sheet 2 is conveyed onwards, dried, and conveyed to a delivery 3 over a transfer cylinder.

Figure 7:
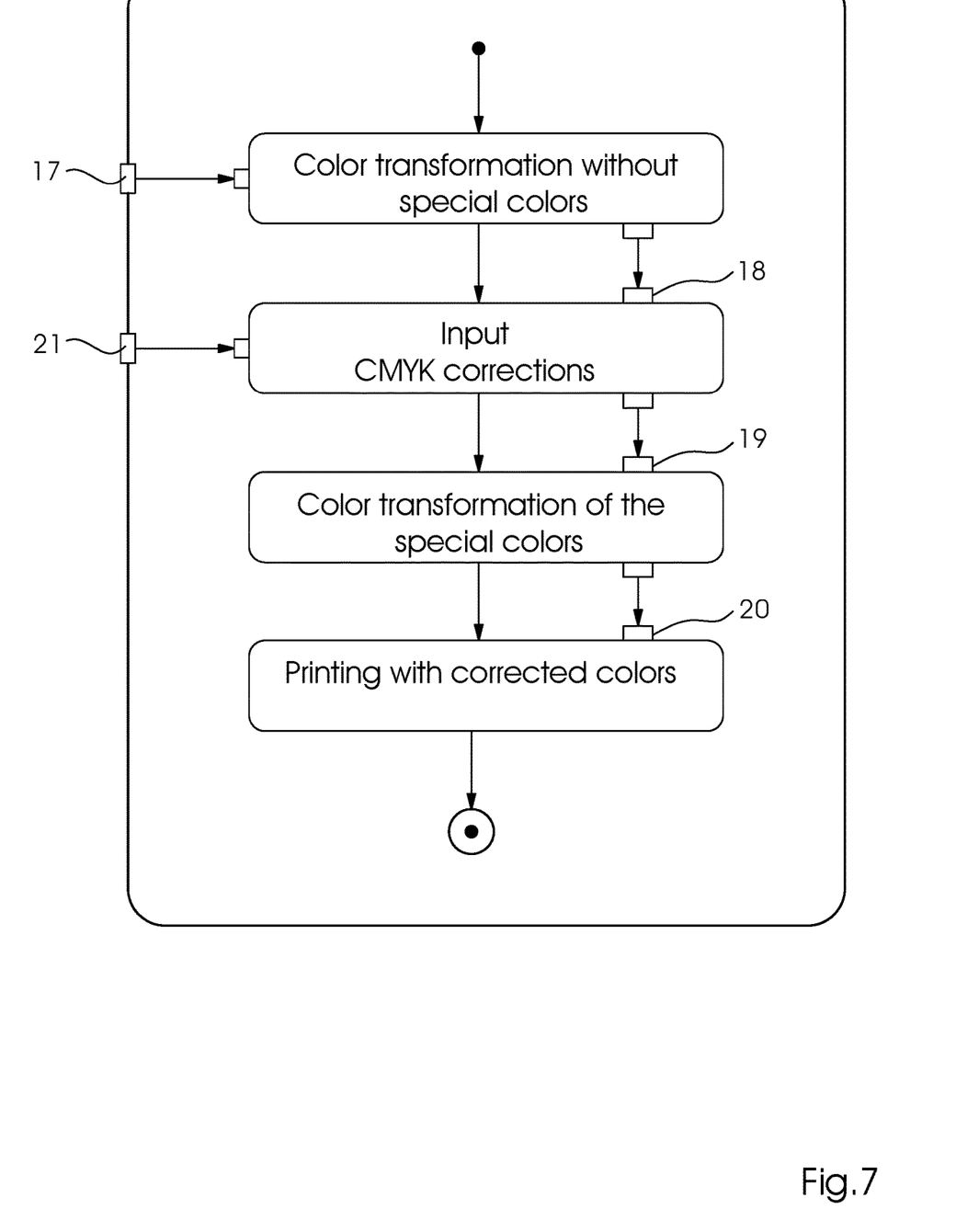
FIG. 7 is a schematic flow chart of the method of the invention.

In order to provide operators with a chance to make color corrections in a color space 18 they are familiar with, it is necessary to make corrections 21 in an intermediate color space 18, which usually corresponds to the offset color space 18. FIG. 7 is a schematic flow chart of the method of the invention required for this purpose. Unfortunately, a correction 21 of the color definitions in a first or input color space 17 of a PDF coming from a preprint department is impossible because the colors to be printed are influenced by transparencies or overprinting.

Figure 6:
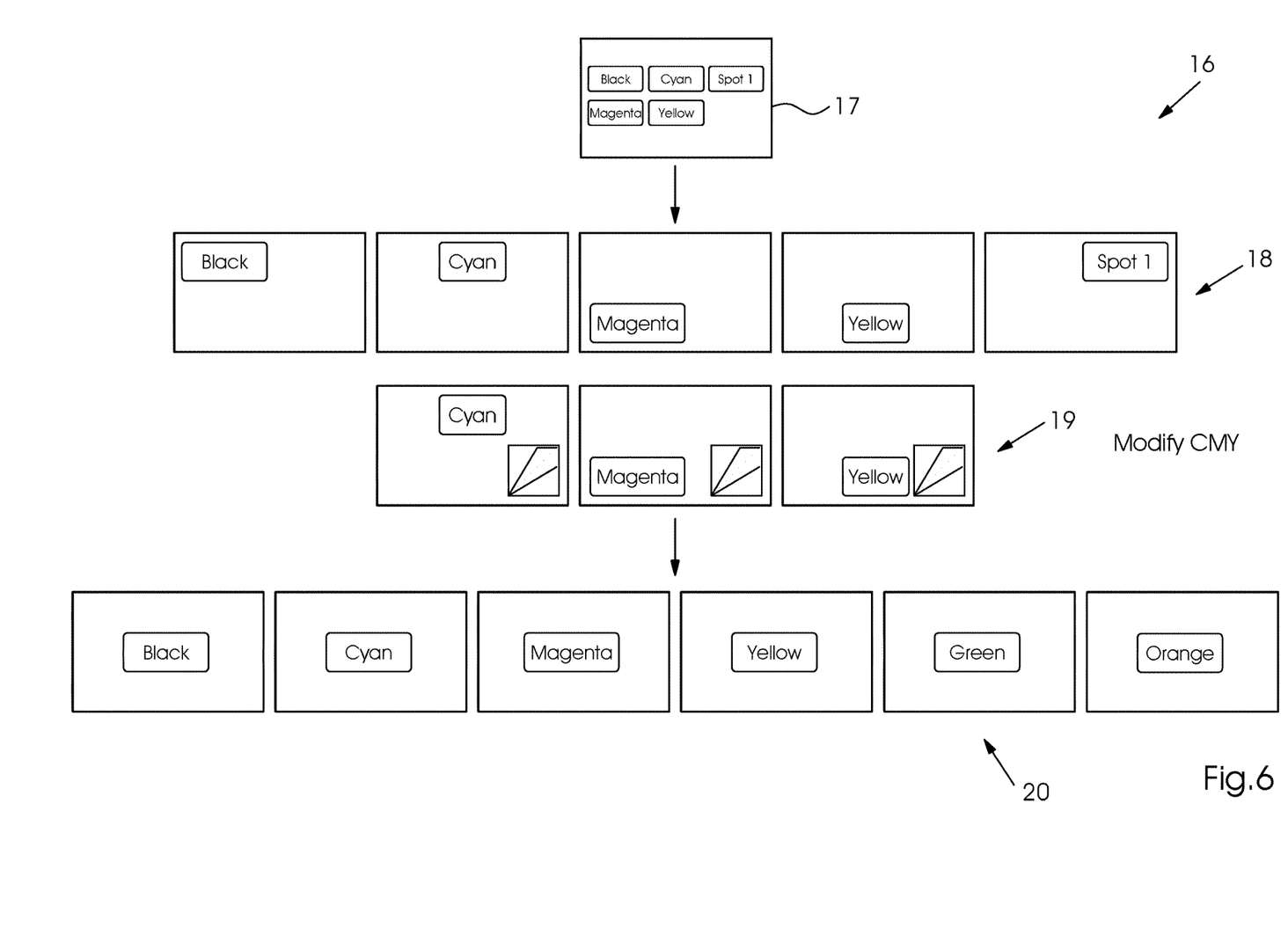
FIG. 6 is a block diagram illustrating a two-stage color transformation of the invention.

In order to solve this problem, the color transformation is carried out in two stages 16 shown in FIG. 6. The first stage is a conversion from the input color space 17 of the PDF into the intermediate color space 18, which may be referred to as an "offset" CMYK color space 18, while keeping all special colors.

Figure 3:
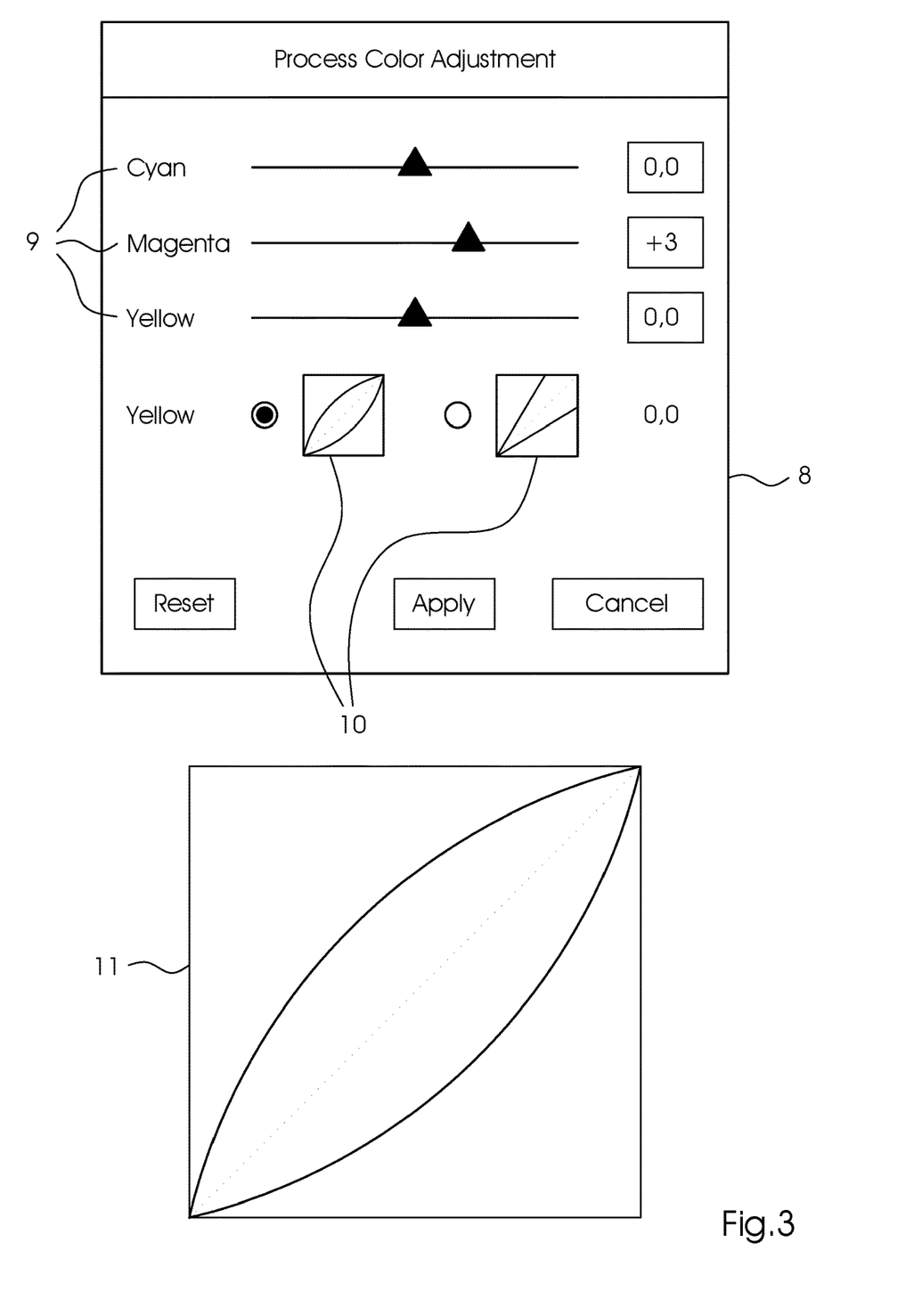
FIG. 3 illustrates a graphical user interface with a mode of "offsetting 50% value" and a corresponding control curve.

This is the point where the correction method based on a correction factor or correction curve 11, 13, 14 (see FIGS. 3, 4 and 5) for every individual CMYK component will set in. This method in fact corresponds to a film thickness correction on an analog printing press.

The second stage is a transformation from a corrected intermediate color space 19 to an output color space 20. In this process, the correction is reproduced in the output or target color space 20 of the inkjet printing machine 7. This is shown in a concise way in FIG. 6.

Figure 2:
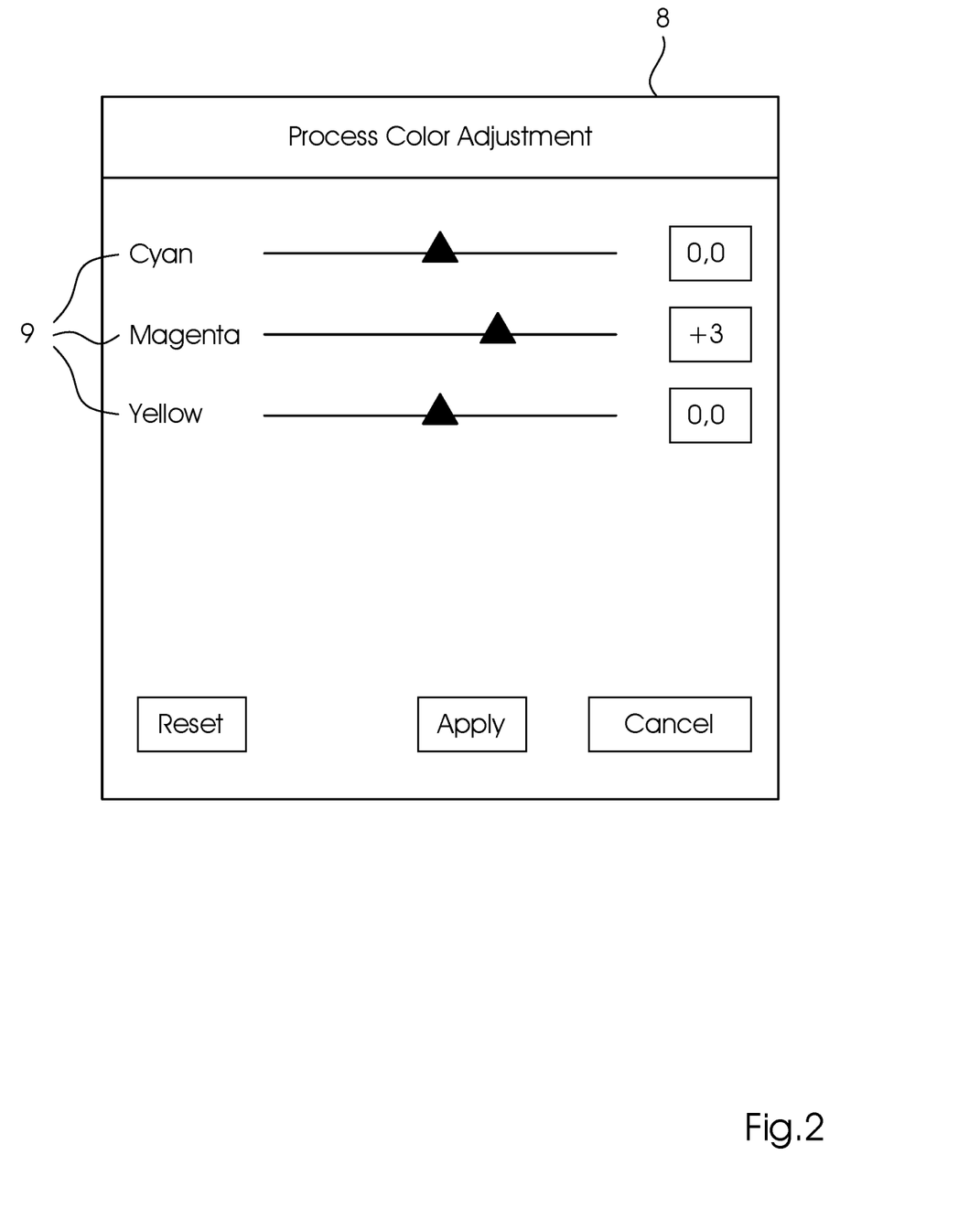
FIG. 2 illustrates a graphical user interface for modifying CMY.

The preferred embodiment of the two-stage method 16 proceeds as follows: as shown in FIG. 2, an operator may modify CMYK for a job by using a controller 9 on a graphical user interface (GUI) for "digital film thickness correction" 8. At present, such a correction option is not provided for the color black (K) because any changes there would have complex effects on the resultant printed image. In most cases, an operator has no desire to make such a manipulation anyway. The intention is to modify individual CMY inks, e.g. to achieve overinking. The results of the modification are shown in a preview on the GUI 8.

Then the calculation is made in a two-stage color matching process.

In the first stage, the digital sheets are converted to the CMYK "offset" colors in the intermediate color space 18 while keeping all special colors, i.e. CMYK separations and a separation for every special color present on the sheet are created (see FIG. 6). This is where the correction process on the basis of a correction factor or correction curve 11, 13, 14 for every individual CMY component will set in, which is a process, in fact, corresponding to a film thickness correction on an analog, i.e. offset or flexographic printing press, which is illustrated for comparison as a curve 15 in the lower part of FIG. 5.

Due to the fact that in contrast to the analog printing press, an ink limit needs to be taken into account in inkjet printing machines 7, a maximum ink amount needs to be respected in the simulated ink film thickness correction process. This is represented in a corresponding way in the resultant correction curve 14 shown in the upper section of FIG. 5 for comparison with the corresponding correction curve 15 for the analog printing press shown in the lower section.

Figure 4:
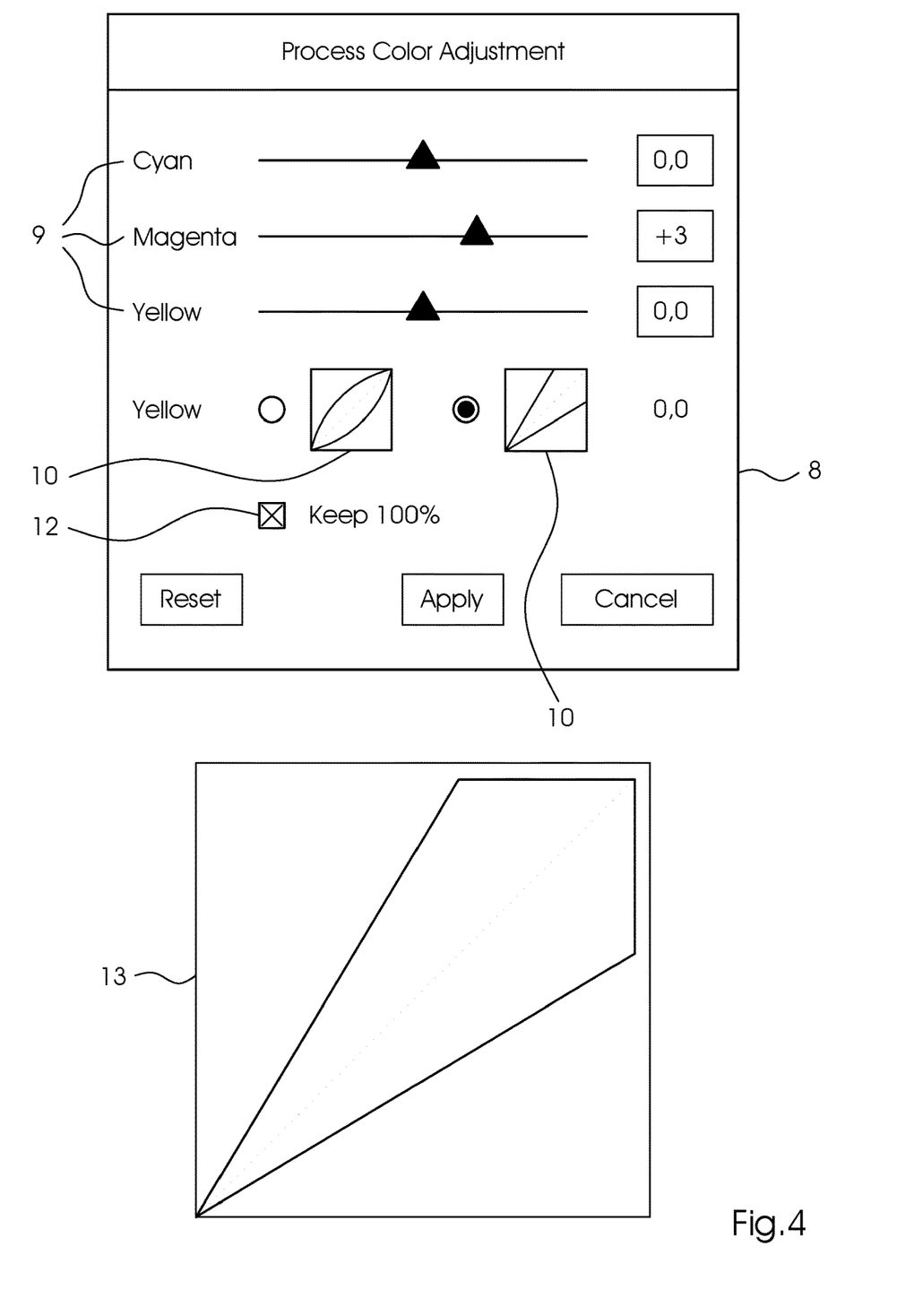
FIG. 4 illustrates a graphical user interface with an additional mode of "maintaining 100% values" and a corresponding control curve.
Figure 5:
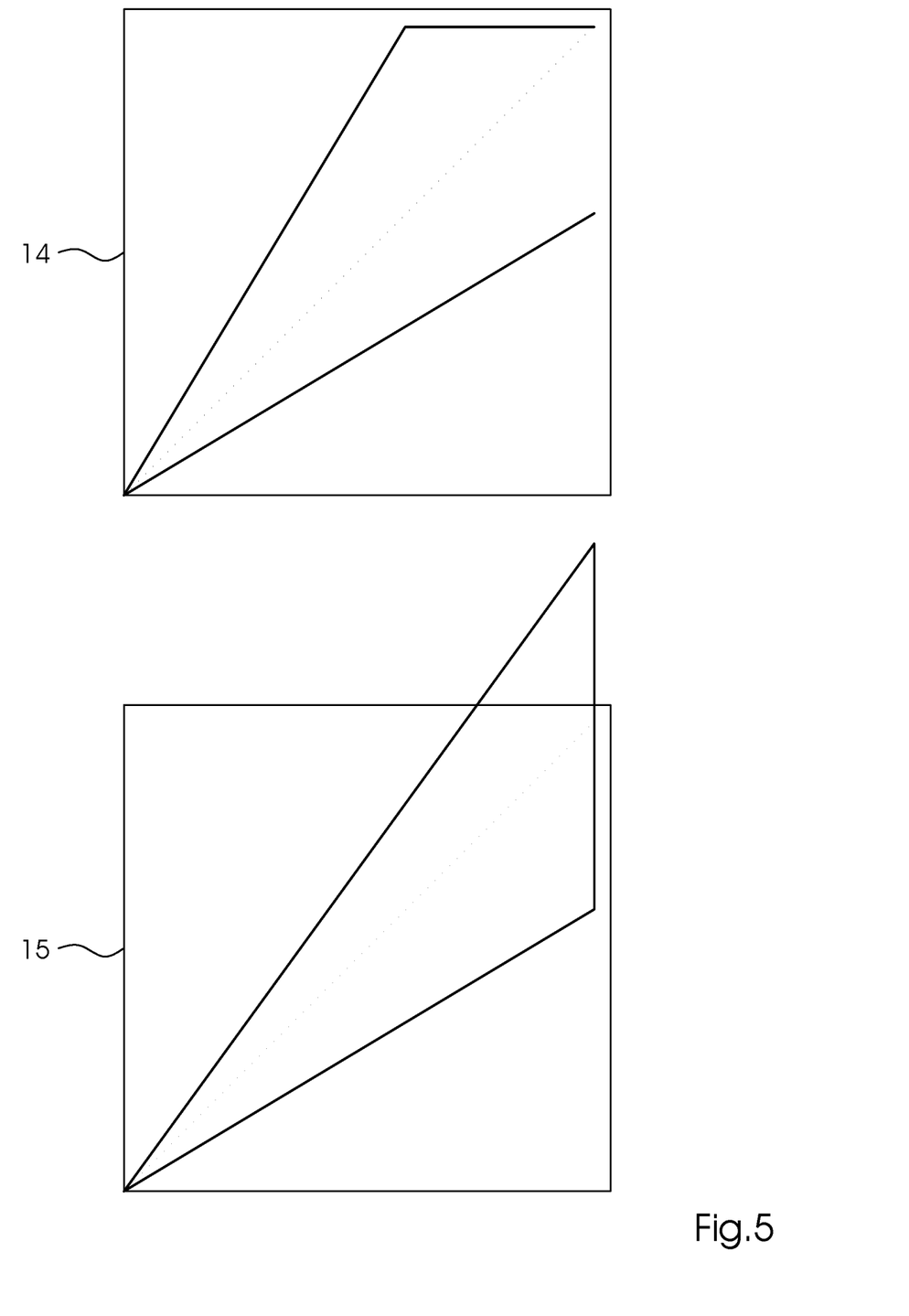
FIG. 5 illustrates a correction curve for an offset printing press and for comparison a correction curve respecting the maximum ink limit in an inkjet printing machine.

When the film thickness is reduced in an analog printing press (see the lower section of FIG. 5), the 100% value is likewise lowered. This may likewise optionally be set in the method of the invention. In this particularly preferred embodiment, an operator may keep the 100% values if the graphical user interface 8 offers a corresponding "keep 100% values" mode 12. This, as well as the resultant correction curve 13, is shown in FIG. 4.

In order to keep the 100% value while ensuring that there is no disruption in the tone values, there is another preferred embodiment where a correction curve 11 involving a modification/shifting of the 50% value is created. This mode 10 may likewise optionally be activated by the operator through the GUI 8 (see FIG. 3).

The corrections 21 in the CMY color values that have been modified in this way may then be used to carry out the second color transformation stage of the two stage transformation 16 into the actually desired output color space 20 of the inkjet printing machine.

The following is a summary list of reference numerals and the corresponding structure used in the above description of the invention:
1 feeder
2 printing substrate
3 delivery
4 inkjet printing unit
5 inkjet print head
6 computer
7 inkjet printing machine
8 graphical user interface for modifying CMY
9 CMY controller
10 50% value modification/shift mode
11 50% value modification/shift correction curve
12 "keep 100% values" mode
13 "keep 100% values" correction curve
14 correction curve including respecting the maximum ink limit in an inkjet printing machine
15 correction curve for an analog printing press
16 two-stage color transformation
17 input color space (preprint PDF)
18 intermediate color space ("offset" CMYK color space)
19 corrected intermediate color space/corrected print data
20 output color space (inkjet)
21 applied corrections

The invention claimed is:

1. A method for color control in a printing process on an inkjet printing machine, the method comprising the following steps:
   carrying out a color transformation of print data from a first color space into a process color space required for a printing operation in two stages including a first stage using a computer to transform print data of the printing operation from the first color space into an intermediate color space while keeping all special colors being used, and a second stage using the computer to transform the corrected print data including the special colors from the intermediate color space to the process color space;
   correcting the print data after the first stage of the color transformation, using the corrected print data by the computer as starting values for the second stage of the color transformation and subsequently printing the print data having been transformed into the process color space on the inkjet printing machine;
   the first color space corresponding to a CMYK color space or to a flexographic printing color space or to an RGB color space, each with special colors, the intermediate color space corresponding to a CMYK color space with special colors, and the process color space corresponding to a CMYK color space with additional process colors OGV; and
   using the computer to only correct the CMY print data and not the K print data or the special colors not yet having been transformed, upon correcting the print data of the process color space in the intermediate color space after the first stage of the color transformation.

2. The method according to claim 1, which further comprises subdividing the print data in the first color space into areas with different color spaces.

3. The method according to claim 1, which further comprises carrying out the correction of the print data by the computer by using a correction factor or a correction curve for every individual CMY component of the print data.

4. The method according to claim 3, which further comprises using a maximum ink limit to limit the correction of the print data by the computer in the intermediate color space after the first stage of the color transformation by using the correction factor or the correction curve.

5. The method according to claim 1, which further comprises using the computer to provide a user interface allowing an operator of the inkjet printing machine to input correction values to correct the print data of the process color space.

* * * * *